United States Patent
Menegoli et al.

(10) Patent No.: US 6,598,000 B1
(45) Date of Patent: Jul. 22, 2003

(54) METHOD AND APPARATUS FOR DETECTING MOTION OF A MOTOR FOR A DISK DRIVE SYSTEM

(75) Inventors: Paolo Menegoli, San Jose, CA (US); Ender T. Eroglu, Campbell, CA (US); Whitney H. Li, San Jose, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 227 days.

(21) Appl. No.: 09/643,219

(22) Filed: Aug. 18, 2000

(51) Int. Cl.$^7$ ............................................... G06F 13/00
(52) U.S. Cl. ............................. 702/65; 702/60; 702/64; 702/91; 702/116
(58) Field of Search .......................... 702/64, 60, 65, 702/91, 116, 145; 318/254; 360/73; 73/66, 116; 324/76, 77

(56) References Cited

U.S. PATENT DOCUMENTS

| | | | |
|---|---|---|---|
| 4,862,052 A | 8/1989 | Unsworth et al. | 318/757 |
| 4,876,491 A | 10/1989 | Squires et al. | 318/138 |
| 4,992,710 A | 2/1991 | Cassat | 318/254 |
| 5,001,405 A | 3/1991 | Cassat | 318/254 |
| 5,003,241 A | 3/1991 | Rowan et al. | 318/761 |
| 5,028,852 A | 7/1991 | Dunfield | 318/254 |
| 5,117,165 A | 5/1992 | Cassat et al. | 318/254 |
| 5,172,036 A | 12/1992 | Cameron | 318/138 |
| 5,187,419 A | 2/1993 | DeLange | 318/805 |
| 5,191,270 A | 3/1993 | McCormack | 318/254 |
| 5,202,614 A | 4/1993 | Peters et al. | 318/254 |
| 5,254,914 A | 10/1993 | Dunfield et al. | 318/254 |
| 5,343,127 A | 8/1994 | Maiocchi | 318/254 |
| 5,397,971 A | 3/1995 | McAllister et al. | 318/254 |
| 5,455,885 A | 10/1995 | Cameron | 388/834 |
| 5,473,725 A | 12/1995 | Chen et al. | 318/254 |
| 5,569,990 A | 10/1996 | Dunfield | 318/254 |
| 5,850,129 A | 12/1998 | Yoshino | 318/254 |
| 5,866,998 A | 2/1999 | Menegoli | 318/254 |
| 5,936,365 A | 8/1999 | Li et al. | 318/439 |
| 5,969,491 A | 10/1999 | Viti et al. | 318/254 |
| 6,078,158 A * | 6/2000 | Heeren et al. | 318/430 |
| 6,144,924 A * | 11/2000 | Dowling et al. | 702/60 |
| 6,198,590 B1 * | 3/2001 | Codilian et al. | 360/73.03 |
| 6,236,174 B1 | 5/2001 | White | 318/254 |
| 6,437,525 B1 * | 8/2002 | Menegoli | 318/254 |
| 2002/0084758 A1 * | 7/2002 | Eroglu et al. | 318/254 |

OTHER PUBLICATIONS

U.S. patent application Ser. No. 08/884,879, filed Jun. 30, pending.

* cited by examiner

*Primary Examiner*—Marc S. Hoff
*Assistant Examiner*—Felix Suarez
(74) *Attorney, Agent, or Firm*—Lisa K. Jorgenson; Andre Szuwalski

(57) ABSTRACT

A method and apparatus are disclosed for controlling the operation of a polyphase motor, and particularly to determining whether the motor is spinning. The method and apparatus include initially sensing an electrical characteristic of a single phase winding of the motor. Having sensed values of the electrical characteristic, a determination is made as to whether or not the motor's rotor is spinning. Upon a determination that the rotor is not spinning, a spin-up operation is performed to bring the spin of the rotor to operable spin speeds. Otherwise, a resynchronization operation is performed.

26 Claims, 2 Drawing Sheets

METHOD AND APPARATUS FOR DETECTING MOTION OF A MOTOR FOR A DISK DRIVE SYSTEM

BACKGROUND OF THE INTENTION

1. Technical Field of the Invention

This invention relates to improvements in circuitry for driving polyphase motors, and more particularly to a method and apparatus for relatively rapidly driving a polyphase motor for a disk drive from an inactive state to an operable state for performing a memory access, and still more particularly to a circuit and method for detecting motion of a polyphase motor for a disk drive system.

2. Background of the Invention

Although the present invention pertains to polyphase and/or polyphase dc motors, in general, it finds particular application in conjunction with three phase dc motors, particularly of the brushless, sensorless type which are used for rotating data media, such as found in computer related applications, including hard disk drives, CD ROM drives, floppy disks, and the like. In computer applications, three phase brushless, sensorless dc motors are becoming more popular, due to their reliability, low weight, and accuracy.

Motors of this type can typically be thought of as having a stator with three coils connected in a "Y" configuration, although actually, a larger number of stator coils are usually employed with multiple motor poles. Typically, in such applications, eight pole motors are used having twelve stator windings and four N-S magnetic sets on the rotor, resulting in four electrical cycles per revolution of the rotor. The stator coils, however, can be analyzed in terms of three "Y" connected coils, connected in three sets of four coils, each physically separated by 90 degrees. In operation, the coils are energized in sequences, in each of which a current path is established through two coils of the "Y", with the third coil left floating. The sequences are arranged so that as the current paths are changed, or commutated, one of the coils of the current path is switched to float, and the previously floating coil is switched into the current path. Moreover, the sequence is defined such that when the floating coil is switched into the current path, current will flow in the same direction in the coil which was included in the prior current path. In this manner, six commutation sequences are defined for each electrical cycle in a three phase motor.

In the past, during the operation of a polyphase dc motor for a disk drive system, such as a spindle motor for spinning the disk media upon which data is stored, it has been recognized that maintaining a known position of the rotor of the motor is an important concern. There have been various ways by which this was implemented. The most widely used way, for example, was to start the spindle motor in a known position, then develop information related to the instantaneous or current position of the rotor. One source of such instantaneous position information was developed as a part of the commutation process, and involved identifying the floating coil, and monitoring its back emf, that is, the emf induced into the coil as it moves through the magnetic field provided by the stator.

Oftentimes, a spindle motor of a disk drive system is slowed due to a relatively prolonged absence of requests to access the disk drive. During these periods of inactivity, the spindle motor may be slowed considerably or stopped altogether. Conventional disk drive systems attempted to quickly spin up the spindle motor from an inactive state by initially determining whether the spindle motor was moving. This determination was accomplished by tri-stating the phase windings of the motor for a sufficient period of time to detect at least two consecutive zero crossings of the back emf signals associated with the phase windings. In the event the rotor is spinning very slowly, the amount of time necessary to detect consecutive zero crossings may undesirably approach several hundred milliseconds. Once consecutive zero crossings of the back emf signals are detected, thereby indicating a spinning rotor, a resynchronization procedure is executed to synchronize to the rotor spin the application of drive signals to the motor's phase windings. In the event successive zero crossings of the back emf signals are not detected even after the lapse of several hundred milliseconds, an inductive sense routine is initiated to determine the position of the rotor, followed by executing a spin-up procedure to bring the spindle motor to the desired operable speed. Consequently, the delay related to returning rotor spin to operable levels may be excessive.

Based upon the foregoing, there is a need for a controller and method for controlling the motor of a disk drive to efficiently increase motor spin to operable spin speeds following periods of disk drive inactivity, and particularly for initially determining whether or not the disk drive motor is spinning.

SUMMARY OF THE INVENTION

The present invention overcomes shortcomings in prior and existing disk drive systems and satisfies a significant need for high speed disk drive operation. According to an embodiment of the present invention, a controller for a polyphase motor, such as the spindle motor of a disk drive, initially senses current on a single selected phase winding of the motor. A period of time is measured until the sensed current reaches and/or surpasses a predetermined threshold current level. The measured period of time is then selectively stored in memory. Current is sensed on the selected phase winding a number of times and time period measurements are taken corresponding thereto. Minimum and maximum measured time periods are thereafter compared with each other. The rotor of the disk drive motor is determined to be spinning if the minimum measured time period and the maximum measured time period are not within a predetermined percentage of each other. Alternatively, the rotor of the disk drive motor is determined to be stopped if the minimum measured time period and the maximum measured time period are within the predetermined percentage of each other.

Having determined whether or not the rotor of the motor is spinning, the controller is capable of relatively quickly bringing the motor to an operable speed for performing a memory access operation. Specifically, in the event the rotor is determined to be spinning, the controller then executes a resynchronization operation to synchronize the application of the drive signals to the already spinning rotor. In the event the controller determines that the motor's rotor is not spinning, a spin-up operation is executed by the controller to spin up the motor from the inactive state to an operable state. Because the time to execute the current sensing operations is substantially less than the time to execute the initial resynchronization operation in prior systems for a slowly moving rotor, the time to bring the rotor up to a spin level to suitably access the disk is markedly reduced.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE EXEMPLARY EMBODIMENTS

The present invention will now be described more fully hereinafter with reference to the accompanying drawings in which an embodiment of the invention is shown.

Figure 1:
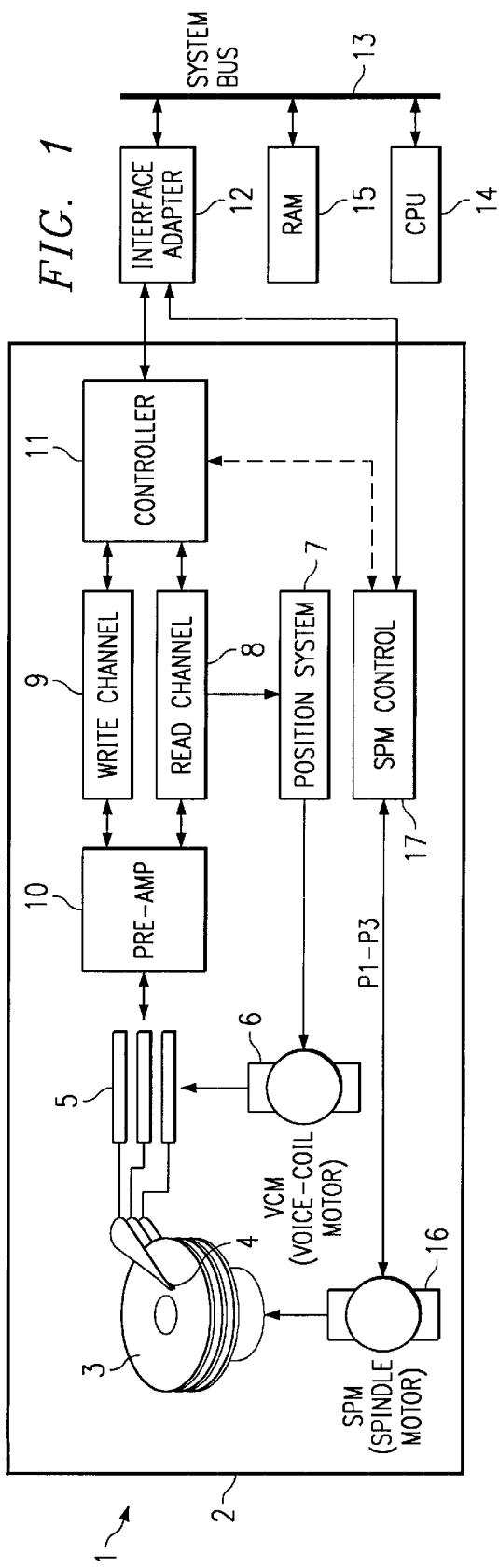
FIG. 1 is a function block diagram of a system having a disk drive according to an embodiment of the present invention.

Referring to FIG. 1, there is shown a block diagram of a data storage and/or computer system 1 including a disk drive 2 in accordance with the present invention. Disk drive 2 includes a storage medium in the form of one of more disks 3, each of which may contain data on both sides of the disk. Data is written to disks 3 and/or read therefrom by one or more read/write heads 4. The read/write head 4 is connected to an arm 5, with both read/write head 4 and arm 5 being positionally controlled by a voice-coil motor ("VCM") 6 and a position system 7. The position system 7, through VCM 6, positionally maintains and/or moves head 4 radially over the desired data on disks 3. A read channel 8 converts an analog read signal from head 4 into digital form. A write channel 9 provides data in analog form to read/write head 4 for storing on a disk 3. A pre-amplifier 10 suitably conditions data read from and data to be-written to disk 4. Channel controller 11 recognizes and organizes the digital data from the read channel 8 and digital data to be sent to write channel 9 into bytes of data. An interface adapter 12 provides an interface between channel controller 11 and a system bus 13 that may be particular to the host (data storage and/or computer-based) system. The host system will also typically have other devices that communicate on system bus 13, including a central processing unit ("CPU") 14 and memory 15. A spindle motor ("SPM") 16 and SPM control circuit 17 rotate disk 3 and maintain disk 3 at the proper speed for performing a memory access operation (read or write operation). The SPM control circuit 17 may communicate with interface adapter 12, as shown in FIG. 1. Alternatively, SPM control circuit 17 may be controlled by or otherwise communicate with channel controller 11, as shown in dashed lines in FIG. 1. It is understood that disk drive 2 may be divided into and/or include other function blocks from those shown in FIG. 1, and that the particular function block implementations illustrated in FIGS. 2 and 3 are presented as an exemplary embodiment of the present invention.

Figure 2:
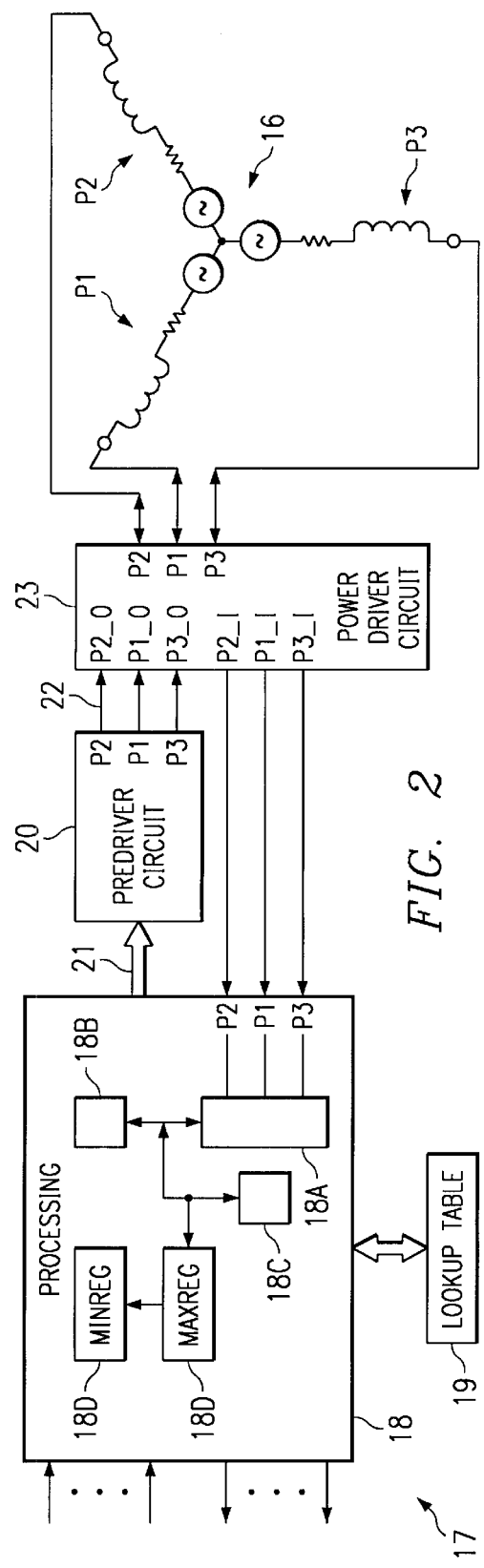
FIG. 2 is a schematic diagram of the controller for the spindle motor of the disk drive of FIG. 1, in conjunction with the spindle motor's phase windings, according to an embodiment of the present invention.
Figure 3:
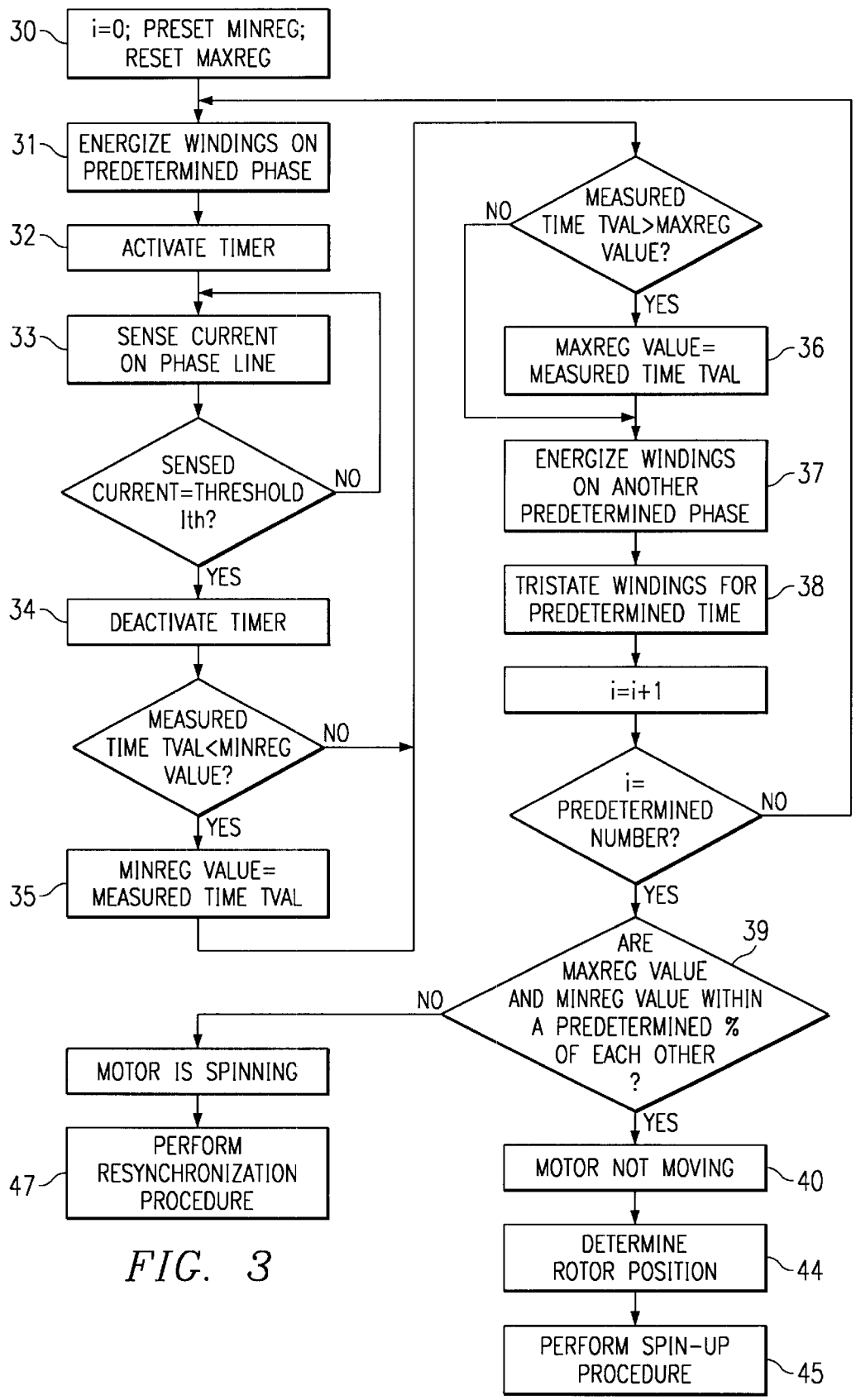
FIG. 3 is a flow chart illustrating the operation of the controller shown in FIGS. 1 and 2 in accordance with a first embodiment of the present invention.

Referring to FIG. 2, there is shown SPM control circuit 17 for controlling spindle motor 16 of disk drive system 1 in accordance with an embodiment of the present invention. The SPM control circuit 17 (hereafter referred to as the "controller 17") may directly communicate with interface adapter 12, as shown in FIG. 1.

Controller 17 preferably controls the sequence of drive signals applied to the input/output (I/O) terminals of phase windings or lines P1–P3 of motor 16 in order to, among other things, suitably spin motor 16 so that data stored on the associated media disk (not shown) may be accessed. It is understood, however, that controller 17 may be utilized in controlling the operation of a polyphase motor for other systems as well.

Controller 17 is preferably programmable to execute a number of operations. For example, controller 17 may be programmed to measure electrical characteristics of the phase windings of motor 16 which can then be used to determine rotor position. In addition, controller 17 may be programmed to execute a resynchronization operation in which drive signals to be applied to phase windings P1–P3 are synchronized with the position of a presently spinning rotor. Controller 17 may be further programmed to execute a spin-up procedure in which drive signals are applied to phase windings P1–P3 to bring motor 16 from a stationary position.

In particular, controller 17 may include or otherwise be associated with a processing block 18 and lookup table 19 (FIG. 2). The lookup table 19 may be utilized to, among other things, store program instructions to be carried out by processing block 18 in controlling the operation of motor 16. Alternatively, controller 17 may include state machine circuitry (not shown) to sequentially step through a series of operations to control the operation of motor 16.

Further, processing block 18 may include sense circuitry 18A to measure current levels in phase windings P1–P3, and timing circuitry 18B to measure the amount of time that elapses for a phase winding current to reach a predetermined threshold level $I_{th}$. Processing block 18 may further include arithmetic circuitry 18C to compare various measured time values with each other, identify the smallest measured time value and determine whether spindle motor 16 is moving based upon the comparisons and identifications. The specific operation of controller 17 is described below. Processing block 18 may further include registers 18D, for storing time values generated by timing circuitry 18A. One such register 18D, minreg, may store a minimum time value generated by timing circuitry 18A. Another register 18D, maxreg, may store a maximum time value generated by timing circuitry 18A.

Controller 17 may further include a predriver circuit 20 which, in general terms, receives control signals 21 from processing block 18 and derives drive signals 22 to be applied to phase windings P1–P3 of motor 16. Predriver circuit 20 may include memory and other circuitry (not shown) for utilizing any of a number of drive techniques for driving and/or controlling motor 16, such as pulse width modulation.

Controller 17 may further include a power driver circuit 23 which is adapted to receive an electrical signal from any terminal of the phase winding P1–P3 that is not currently being driven, and send the received signal to processing block 18. Power driver circuit 23 also receives drive signals 22 from predriver circuit 20 and applies drive signals 22 to phase windings P1–P3 of motor 16.

The operation of embodiments of the present invention will be described with reference to FIG. 3. As discussed above, a disk drive 2 may undergo a relatively prolonged period of inactivity without having to respond to a request for memory access. During this period of inactivity in which the disk drive is in a "standby" state, the motor is undriven by controller 17. Consequently, motor 16 may considerably spin down to a relatively slow speed and in some instances stop spinning altogether. In order to relatively rapidly ramp up motor 16 from a standby state in response to a request for memory access, controller 17 initially causes a predetermined phase to be energized. Controller 17 senses or measures an electrical characteristic of a single, selected phase winding or line of motor 16 to determine whether or not the motor's rotor is spinning.

In accordance with an embodiment of the present invention, minreg 18D is preset at step 30 (FIG. 3) so that each register bit slice therein stores a logic high value, and maxreg 18D is reset so that each register bit slice therein stores a logic low value. Next, the appropriate windings P1–P3 of motor 16 are energized for a predetermined phase, such as phase 0, at step 31. Timing circuitry 18B is then initialized and activated to begin counting at step 32 and sense circuitry 18A senses current on a single phase winding (P1, P2 or P3) at step 33 at that time, until the sensed current approximately reaches and/or surpasses a predetermined threshold current level $I_{th}$. At that point, timing circuitry 18B is deactivated at step 34 and the measured time value Tval shown in timing circuitry 18B is compared with the values stored in minreg 18D and maxreg 18D by arithmetic circuitry 18C.

In particular, if the measured time value Tval stored in timing circuitry 18B is less than the value presently stored in minreg 18D, then the measured time value Tval is stored in minreg 18D at step 35. Moreover, if the measured time value Tval is greater than the value stored in maxreg 18D, then the measured time value Tval stored in timing circuitry 18B is stored in maxreg 18D at step 36.

In the event the sensed current does not reach and/or surpass the predetermined threshold current level $I_{th}$, an error flag is set within controller 17. At this point, the threshold current level $I_{th}$ may be reset to another level.

Next, the appropriate windings P1–P3 of motor 16 are energized at step 37 corresponding to a second predetermined phase, such as phase 3. The windings P1–P3 are energized for a first predetermined period of time. The windings P1–P3 are then tristated for a second predetermined period of time at step 38. Windings P1–P3 are energized during step 37 to compensate for and/or offset the windings being energized during step 31.

Steps 31–38 are repeated a predetermined number of times, such as six times. Once a predetermined number of measured time values.Tval have been taken, the value stored in minreg 18D and the value stored in maxreg 18D are compared to each other at step 39 by arithmetic circuitry 18C. If the value stored in minreg 18D, representing the minimum measured time value $Tval_{min}$, is within a predetermined percentage of the value stored in maxreg 18,D, the maximum measured time value $Tval_{max}$, then processing block 18 determines that the rotor of motor 16 is not spinning at step 40. In the alternative, processing block 18 determines at step 39 that the rotor of motor 16 is spinning if the minimum measured time value $Tval_{min}$ is not within a predetermined percentage of maximum measured time value $Tval_{max}$. Having determined whether or not the rotor of motor 16 is spinning, controller 17 performs the appropriate drive operation or set of drive operations to bring motor 16 to an operable speed for disk drive 2 to perform a memory access operation.

For examples, if controller 17 determines that the rotor of motor 16 is not spinning, the position of the rotor of motor 16 is then determined at step 44. Having information relating to the position of stationary motor 16, a spin-up operation is performed at step 45 so as to spin the rotor and bring the spin speed thereof to an operable level at which the requested memory access operation may occur. By eliminating an initial resynchronization operation and instead initially performing a sensing operation immediately followed by a spin-up operation, controller 17 is capable of bringing the disk drive 2 from a standby state to an operable state much more rapidly than experienced in prior disk drive systems.

If controller 17 determines that the rotor of motor 16 is spinning, controller 17 executes a resynchronization operation at step 47 to synchronize and/or resynchronize the application of drive signals to the spinning motor 16. In this way, the spin of the rotor will be smoothly increased upon application of the drive signals.

Controller 17 has been described within the context of a disk drive 2 for exemplary purposes only. It is understood that the embodiment of the present invention may be utilized in devices that include a polyphase motor other than disk drive systems. For instance, controller 17 may form part of a compact disc (CD) player for controlling the spin of the spindle motor thereof.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of controlling a polyphase motor having a rotor and phase windings, comprising:

sensing current on a single phase winding of the polyphase motor;

measuring the period of time during which the current is sensed;

repeating the sensing and measuring to obtain a plurality of measured periods of time during which the current is sensed;

comparing at least two of the measured periods of time; and determining whether the rotor is spinning based upon the compared measured periods of time.

2. The method of claim 1, wherein the comparing comprises:

identifying maximum and minimum measured periods of time; and comparing the maximum and minimum measured periods of time.

3. The method of claim 2, wherein the determining comprises:

determining that the rotor is not spinning upon an affirmative determination that the maximum and minimum measured periods of time are within a predetermined percentage of each other.

4. The method of claim 2, wherein determining comprises:

determining that the rotor is spinning upon an affirmative determination that the maximum and minimum measured periods of time are not within a predetermined percentage of each other.

5. The method of claim 1, further comprising:

performing a spin-up procedure on the motor upon an affirmative determination that the rotor is not spinning.

6. The method of claim 1, further comprising:

performing a resynchronization procedure on the motor upon an affirmative determination that the rotor is spinning.

7. The method of claim 1, wherein the current sensing comprises:

sensing current on the single phase winding until the current level reaches a predetermined threshold current level.

8. The method of claim 1, further comprising:

energizing windings of the motor corresponding to a first phase before sensing current on the single phase winding; and energizing windings of the motor corresponding to a second phase following measuring the period of time, wherein the second phase is approximately 180° out of phase relative to the first phase.

9. A controller for a multiphase motor, the multiphase motor including a plurality of phase windings and a rotor, comprising:

a first circuit for sensing current on a single phase winding of the polyphase motor a plurality of times;

a second circuit for measuring a period of time each time the current is sensed on the single phase winding by the first circuit;

a third circuit for comparing at least two of the measured periods of time, and determining whether the rotor is spinning based upon the compared measured periods of time; and a fourth circuit for applying drive signals to the phase windings based upon the determination of whether the rotor is spinning.

10. The controller of claim 9, wherein:

the third circuit identifies and compares the maximum and minimum measured periods of time.

11. The controller of claim 10, wherein:

the third circuit determines that the rotor is not spinning based upon the compared maximum and minimum measured time periods being within a predetermined percentage of each other.

12. The controller of claim 10, wherein:

the third circuit determines that the rotor is spinning based upon the compared maximum and minimum measured time periods not being within a predetermined percentage of each other.

13. The controller of claim 9, wherein:

upon a determination that the rotor is not spinning, the fourth circuit applies drive signals on the phase windings that perform a spin-up procedure.

14. The controller of claim 9, wherein:

upon a determination that the rotor is spinning, the fourth circuit applies drive signals on the phase windings that perform a resynchronization procedure.

15. The controller of claim 9, wherein:

the first circuit senses current on the single phase winding each of the plurality of times until the sensed current level is at least approximately equal to a predetermined current level; and each time the current is sensed, the second circuit measures the time the sensed current is approximately less than the predetermined current level.

16. The controller of claim 9, wherein:

the second circuit comprises a timer circuit.

17. The controller of claim 9, wherein:

the third circuit includes arithmetic circuitry.

18. A disk drive system, comprising:

at least one disk on which data is stored;

at least one head positioned proximally to the disk;

a spindle motor, connected to spin the disk, having a rotor and a plurality of phase windings; and spindle motor control circuitry, connected to the phase windings of the spindle motor, for controlling the spindle motor, the spindle motor control circuitry being responsive to a request for performing a memory access following a period of disk drive inactivity by initially sensing an electrical characteristic appearing on one phase winding of the spindle motor a plurality of times, determining a time-based measurement corresponding to each time the electrical characteristic is sensed, comparing at least two of the time-based measurements, determining whether the rotor is spinning based upon the compared time-based measurements and selectively applying drive signals to the phase windings of the spindle motor based upon the determination to bring the spindle motor to an operable speed for performing the requested memory access.

19. The disk drive system of claim 18, wherein:

the spindle motor control circuitry includes current sense circuitry for sensing current flowing in the one phase winding each of the plurality of times until the sensed current is at least approximately equal to a predetermined current level, and timing circuitry for measuring periods of time during which the sensed current is less than the predetermined current level.

20. The disk drive system of claim 19, wherein the spindle motor control circuitry comprises:

circuitry for comparing the time-based measurements having the minimum and maximum values to each other, and determining whether the rotor is spinning based upon the comparison of the time-based measurements having the minimum and maximum values.

21. The disk drive system of claim 18, wherein:

the time-based measurements comprise the periods of time that the current is sensed by the spindle motor control circuitry.

22. The disk drive system of claim 18, wherein:

the spindle motor control circuitry comprises drive circuitry for, upon a determination that the spindle motor is not spinning, applying drive signals to the phase windings of the spindle motor to perform a spin-up operation.

23. The disk drive system of claim 18, wherein:

the spindle motor control circuitry comprises drive circuitry for, upon a determination that the spindle motor is spinning, applying drive signals to the phase windings of the spindle motor to perform a resynchronization operation.

24. A device including a polyphase motor having a plurality of phase windings and a rotor, comprising:

a sense circuit for sensing current on a single phase winding of the polyphase motor a plurality of times;

a timer circuit for measuring a period of time each time the current is sensed on the single phase winding by the sense circuit; and an arithmetic circuit for comparing at least two of the measured periods of time, and determining whether the rotor is spinning based upon the compared measured periods of time.

25. The controller of claim 9, wherein the fourth circuit energizes the phase windings of the motor between each current sensing on the single phase winding.

26. The disk drive system of claim 18, wherein the spindle motor control circuitry energizes the phase windings of the spindle motor between each sensing of an electrical characteristic on the one phase winding.

* * * * *

UNITED STATES PATENT AND TRADEMARK OFFICE
CERTIFICATE OF CORRECTION

PATENT NO. : 6,598,000 B1
DATED : July 22, 2003
INVENTOR(S) : Paolo Menegoli et al.

It is certified that error appears in the above-identified patent and that said Letters Patent is hereby corrected as shown below:

Column 1,
Line 5, replace "BACKGROUND OF THE INTENTION" with -- BACKGROUND OF THE INVENTION --

Column 5,
Line 41, replace "values.Tval" with -- values Tval --
Line 46, replace "18,D," with -- 18D, --
Line 58, replace "For examples," with -- For example, --

Signed and Sealed this

Fourteenth Day of October, 2003

JAMES E. ROGAN
*Director of the United States Patent and Trademark Office*